(No Model.)
C. M. GRAVES.
HUB ATTACHING DEVICE.
No. 514,595. Patented Feb. 13, 1894.
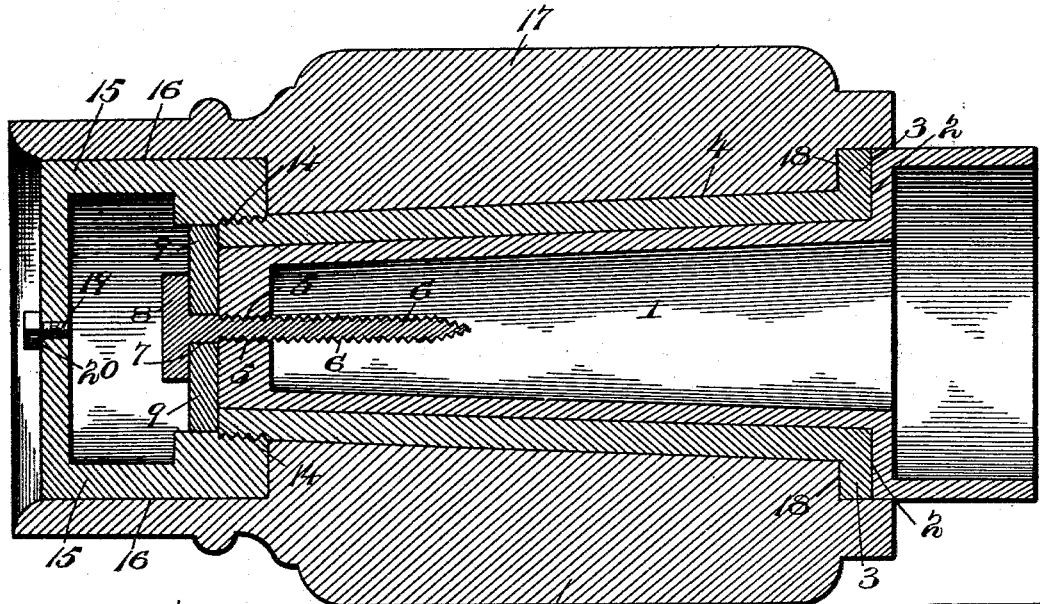
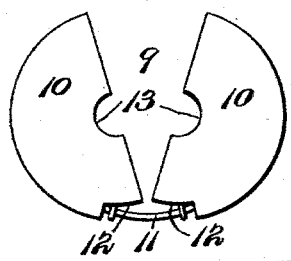
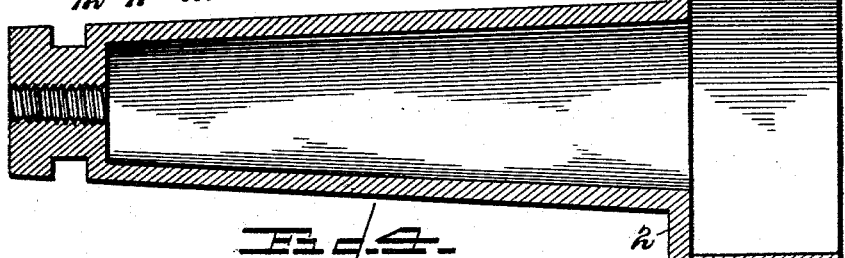
Witnesses
E. H. Stewart
N. W. Riley
Inventor
Cashious M. Graves,
By his Attorneys,
C. A. Snow & Co.

UNITED STATES PATENT OFFICE.

CASHIOUS M. GRAVES, OF EDDYVILLE, KENTUCKY.

HUB-ATTACHING DEVICE.

SPECIFICATION forming part of Letters Patent No. 514,595, dated February 13, 1894.

Application filed September 11, 1893. Serial No. 485,289. (No model.)

*To all whom it may concern:*

Be it known that I, CASHIOUS M. GRAVES, a citizen of the United States, residing at Eddyville, in the county of Lyon and State of Kentucky, have invented a new and useful Hub-Attaching Device, of which the following is a specification.

The invention relates to improvements in hub attaching devices.

The object of the present invention is to improve the construction of the means employed for attaching hubs to axles, to obviate the necessity of employing wedges or wedge-shaped flanges for fastening an axle box to a hub, and to facilitate the lubrication of the parts.

The invention consists in the construction and novel combination and arrangement of parts hereinafter fully described, illustrated in the accompanying drawings and pointed out in the claims hereto appended.

In the drawings—Figure 1 is a longitudinal sectional view of a hub illustrating the manner of securing the same to an axle skein. Fig. 2 is a detail view of the spring washer. Fig. 3 is a detail view of a spindle of a metal axle provided with an annular groove to receive the spring washer. Fig. 4 is a similar view of an axle skein provided with an annular groove.

Like numerals of reference indicate corresponding parts in all the figures of the drawings.

1 designates an axle skein having its inner end enlarged to form a shoulder 2, against which bears an outwardly extending annular flange 3 of an axle box 4. The axle skein, which is designed to be secured on a wooden axle (not shown) in the ordinary manner, is provided at its outer end, which is closed, with a threaded perforation 5 for the reception of a screw 6, which engages the female threads of the perforation 5, and which also extends within the skein for engaging the axle to secure the skein thereon. The screw 6 projects outward beyond the skein and has a smooth connecting portion or neck 7, and is provided at the outer extremity thereof with a circular head or disk 8, which forms an annular recess between it and the adjacent end of the skein for the reception of a spring washer 9 extending annularly beyond the skein, and engaging the outer end of the axle box, whereby the latter is securely retained on the skein between the shoulder 2 and the washer 9. The spring washer 9 is composed of two sections 10, which are segmental and which are connected by a curved spring 11, arranged in recesses 12 of the sections 10, and completing the circular form of the sections when the latter are in contact. The sections 10 are provided with opposite semi-circular or segmental recesses 13 adapted to form a central opening to receive the neck of the screw. The outer end of the axle box is threaded at 14 exteriorly, and is engaged by an interiorly threaded cylindrical cap 15, which fits in an annular recess 16 of a hub 17 and entirely closes the outer end thereof to exclude dust from the parts, and it is arranged slightly within the extreme outer edges of the hub. The hub 17 is provided at its inner end with an annular recess 18 to form a shoulder to fit against the flange 3 of the axle box, and it is secured on the latter between the said flange 3 and the cylindrical cap 15, without the necessity of employing the usual wedges or wedge-shaped flanges to effect such a result. The cylindrical cap 15, which closes the outer end of the hub forms an oil chamber, whereby a suitable lubricant may be supplied to the axle skein and the adjacent parts; it is provided with a threaded oil hole 19, which is normally closed by a threaded plug 20.

It will be readily apparent that the means for attaching the hub are simple and comparatively inexpensive in construction, that the hub is positively secured to the axle skein and may be readily removed therefrom, and that the parts may be readily lubricated.

Changes in the form, proportion and the minor details of construction may be resorted to without departing from the principle or sacrificing any of the advantages of this invention.

The annular groove which receives the spring washer instead of being formed by the screw 6 may be constructed in an extended portion of an axle or axle skein as illustrated in Figs. 3 and 4. The axle box rotates with the hub, and there is no liability of the cylindrical cap 15 unscrewing while backing.

What I claim is—

1. The combination of an axle skein provided at its inner end with a shoulder, an axle box arranged on the skein and having its outer end exteriorly threaded and provided at its inner end with an outwardly extending annular flange fitting against the shoulder of the axle skein, a hub receiving the axle box and provided at its ends with annular recesses forming shoulders and having its inner end bearing against the flange of the axle box, a screw secured to the axle skein and connected with the axle box and retaining the latter on the skein, and an interiorly threaded cylindrical cap forming an oil chamber and engaging the exteriorly threaded outer end of the axle box and entirely closing the outer end of the hub and engaging the latter, substantially as described.

2. The combination of an axle skein provided at its outer end with a threaded perforation, an axle box arranged on the skein, a screw engaging the threaded perforation of the axle skein and projecting outward therefrom and having a head separated from the axle skein by a space, and a spring washer arranged in said space and composed of two sections, and a connecting spring and extending annularly beyond the skein and engaging the outer end of the axle box, substantially as described.

3. The combination of an axle skein provided at its inner end with an annular shoulder and having at its outer end a threaded perforation, an axle box arranged on the skein and having its outer end exteriorly threaded and provided at its inner end with an annular flange, a screw engaging the threaded perforation of the axle skein and having a projecting neck and a head at the outer end of the same, a washer mounted on the neck of the screw and composed of two segmental sections and a connecting spring and extending beyond the axle skein and engaging the axle box, a hub receiving the axle box and provided at its ends with recesses, and a cylindrical cap interiorly threaded and engaging the outer end of the axle box and fitting in and closing the outer end of the hub, substantially as described.

In testimony that I claim the foregoing as my own I have hereto affixed my signature in the presence of two witnesses.

CASHIOUS M. GRAVES.

Witnesses:
J. S. MATTHIS,
SAM P. THOMAS.